3,642,978
PROCESS FOR PRODUCING STABLE CYTOCHROME C PREPARATION

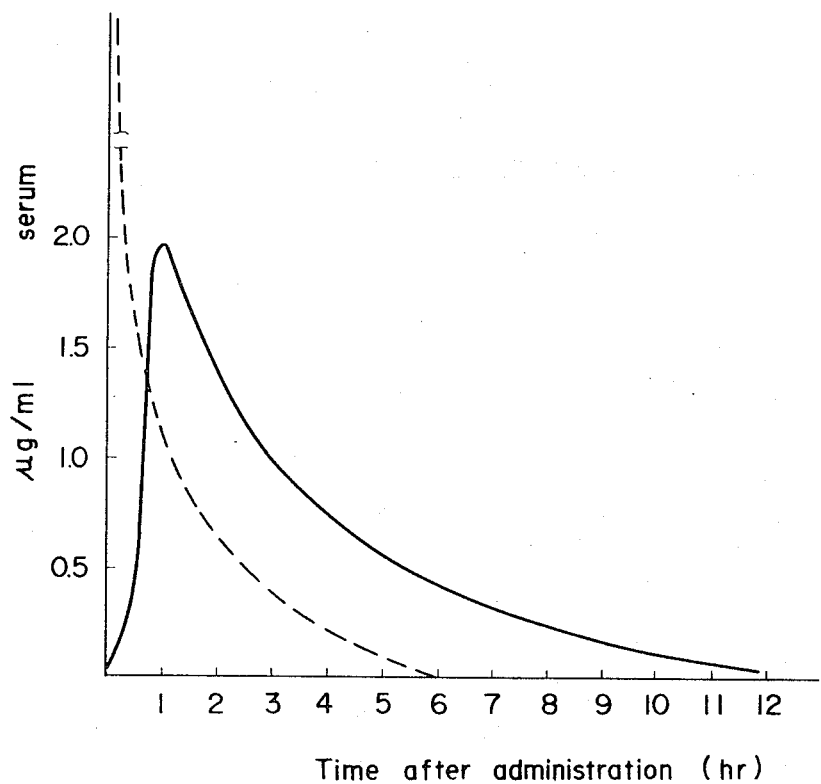

Nobuhisa Ogawa, Sakaecho Sokashi, Japan, assignor to Mochida Seiyaku Kabushiki Kaisha, Kita-ku, Japan
Filed Feb. 12, 1970, Ser. No. 10,746
Claims priority, application Japan, Mar. 5, 1969, 44/16,266
Int. Cl. A61k 25/00, 27/12
U.S. Cl. 424—37
7 Claims

ABSTRACT OF THE DISCLOSURE

Process for producing stable cytochrome c preparation, by gelating an aqueous solution containing cytochrome c and gelatin and drying the resulting substance by removing the water while retaining the cytochrome c in a colloidal gel state.

SUMMARY OF THE INVENTION

Cytochrome c is a haem-containing protein which exists in almost all animals and plants as well as microbes and acts as an important factor in the respiration of cells. The biochemical function of this substance has been known in detail through studies: As one in a series of cytochromes such as cytochrome a, and cytochrome b, cytochrome c constitutes a vital factor in the regulation of oxidizing speed in an energy-producing mechanism. Therefore, cytochrome c has clinical uses in the cases of those diseases supposed to be due to respiratory disorders or an oxygen supply shortage in the cells, such as angina pectoris, myocardial infarction, brain hemorrhage, brain thrombosis, intoxication by drugs, CO-poisoning and their sequelae.

Thus, by virtue of its pharmacological action cytochrome c is considered to be one of the most essential drugs in clinical practice. Its administration has been exclusively parenteral, i.e., via intravenous or intramuscular injection. This is the natural conclusion from the conventional concept of physiology which insists that cytochrome c, being a high-molecular compound, can hardly be transferred into the organism unless administered parenterally.

Meanwhile, cytochrome c, being a protein extracted from the animal heart or from microbes such as yeast, is a hetero-protein to the human body, which may occasionally develop anaphylaxis on account of antigen-antibody reaction to it. Therefore its use calls for utmost caution. Moreover, cytochrome c administered by injection is excreted very rapidly. Its concentration in the blood drops by 50% in 15 minutes after administration. It is known that the effective concentration of cytochrome c in the blood endures only for a short time, the greater part of cytochrome c being wastefully excreted out of the body.

To eliminate this serious drawback of cytochrome c which greately restricts and detracts from its usefulness, the present inventor carried out animal experiments on the practical absorption rate and the effectiveness of cytochrome c as given by oral administration, which is safer than injection. It has, however, been believed that it was difficult for the body to absorb cytochromes administered in this manner.

As a result, I discovered that, contrary to the usual physiological rule, cytochrome c can be slowly absorbed through the intestinal walls; its effective concentration in the blood can last longer than in the case of injection; and its efficacy is not less than in the case of injection. On the basis of these discoveries I perfected the present invention. Thus, it has been established that the clinical usefulness of cytochrome c can be enhanced through its oral administration. This has, however, been hard to put into practice because cytochrome c is extremely unstable.

Specifically, cytochrome c quickly loses its activity when exposed to the oxygen in the air or to light. Apart from these external influences, it is a high-molecular protein, and is therefore liable to conformational changes in natural condition, resulting in a decrease in its activity.

Various methods have been worked out for the stabilization of cytochrome c preparations.

In current commercial practice, a reducing agent such as sodium sulfite or ascorbic acid is added to an aqueous solution of cytochrome c; or in addition to this, an amino acid, peptide, sugar, etc., may be added to it for the purpose of preventing conformational changes. For commercialization of the above-mentioned cytochrome c preparation, said solution must be bottled in ampoules with the air replaced by nitrogen gas; or after lyophilization in the ampoule, the air must be replaced by nitrogen. These procedures are essential to the stabilization of the preparations to be injected. When it comes to the manufacture of internal medicines such as tablets, granules or suppositories, even the compounding of stabilizers such as the above-mentioned reducing agent, amino acid, peptide and sugar is insufficient to prevent cytochrome c from losing its activity, and this product is accordingly not readily available for clinical use.

I accordingly undertook the development of a process for producing a cytochrome c preparation suitable for oral administration and discovered that a stable cytochrome c preparation can be obtained by first cooling or slowly dehydrating an aqueous colloidal mixture of cytochrome c and gelatin to transform it into gel and then drying it by removal of water retaining it in a colloidal gel state. The addition of any stabilizer other than gelatin is then unnecessary.

A representative method of doing this is as follows:

(a) Gelatin is added to an aqueous solution of cytochrome c. The resulting solution is heated for dissolution to a temperature insufficient to impair the activity of the cytochrome c (preferably to 40–50° C.), is poured into a liquid which does not mix with water and never becomes highly viscous or frozen at low temperatures, such as a vegetable oil (e.g. castor oil, Camellia oil or liquid paraffin), mineral oil, or hexadecyl alcohol, and the solution is cooled while stirring. Alternatively, the solution is dropped into the above-mentioned liquid to form gel-like globules. These gel-like globules are filtered to separate them out, and under reduced pressure or a dry air, left at a temperature assuring the maintenance of the collidal gel state, to dry slowly. Thus, perfectly solidified globular granules can be obtained. The cooling temperature at which the globules are to be left varies in dependence on the gelatin concentration, but must be one that can assure retention of the colloidal gel state. Preferably it is below 20° C.

The above drying may be done with such solvents for dehydration as acetone or alcohol, but the initial drying must be carried out by using a solvent having a dehydrating ability which is controlled by the addition of water. Otherwise only the granular surface will get dry and solid, resulting in the loss of the colloidal gel state. Thus, it is desirable to carry out the dehydration by starting with a solvent having a weak dehydrating ability and steadily changing to one having a stronger dehydrating ability. The globlular granules mentioned above can be brought to the desired diameter through appropriate selection of the gelatin concentration, method of agitation, dropping method, type of liquid immiscible with water, and temperature.

(b) The above-mentioned mixture of gelatin and an aqueous solution of cytochrome c is thinly spread and poured into a mold where it is cooled to gel, and left to dry in the air at a relatively low temperature at which it retains its colloidal gel state, preferably at less than 20° C., or slowly dehydrated in a dry gas. The resulting dry, solid substance is crushed to the desired size to produce the granules.

The objective of the present invention can be attained by either method (a) or method (b). Method (a) has the advantage that it can easily produce uniform globular granules and that an enteric coating can easily be applied to said granules.

For oral administration, the granules thus obtained may be employed as a granular preparation with an enteric coating for the prevention of cytochrome c decomposition by gastric acids and pepsin. Alternatively, they may be molded under pressure into common tablets, to which an excipient may be added, or manufactured as suppository by suspending the granules without the enteric coating in a suppository base such as molten hardened oil, cacao butter or polyethyleneglycol, and pouring the suspension into a mold.

The cytochrome c preparations thus manufactured are used as internal medicines in the form of granules or tablets or as a suppository. As compared with those preparations which are injected, they are less likely to induce anaphylaxis.

The stable cytochrome c preparations produced by the method of the present invention are very much improved over the conventional preparations and are extremely useful from both a medical and a pharmaceutical point of view.

The cytochrome c-stabilizing mechanism of the present invention is not yet fully understood, but it is supposed to be as follows: The gelated mixture of the aqueous solution of cytochrome c- with gelatin is dehydrated while maintaining it in the colloidal gel state. The molecules of cytochrome c are thereby maintained in a diffused condition in the gelatin gel. They are therefore not directly exposed to such external effects as oxygen or light, and are effectively protected from them, so that the cytochrome c molecule can exhibit a strong resistance to activity loss.

Thus, in the method of the present invention the indispensable condition for stabilizing cytochrome c is to dry the mixture of gelatin and aqueous solution of cytochrome c by removing the water while maintaining the mixture in the colloidal gel state. That this can be done is obvious from the following facts.

In the production of the above-mentioned lyophilized cytochrome c for injection, I added gelatin to the aqueous solution of cytochrome c before lyophilization, for the purpose of preventing shrinkage of the lyophilized product and thereby improving its commercial value. I then discovered that gelatin under lyophilization, as shown later in Table 1, made no contribution to the stabilization of cytochrome c. This fact can be verified by the fact that when the ampoule containing cytochrome c is imperfectly sealed, the infiltrating air and moisture discolor the cytochrome c and its activity is sharply lowered. Therefore, it is essential in the case of the conventional lyophilized product with gelatin that the above-mentioned stabilizer be compounded and that product be perfectly insulated from external influences by sealing the ampoule or other container. It is also desirable that the air in the ampoule be replaced by an inert gas such as nitrogen.

In contrast to this it is particularly worthy of note that the stabilizing effect on cytochrome c is very substantial under this invention which, while using the same gelatin, requires neither compounding with other stabilizers nor sealing of the container.

Table 1 lists the results of lyophilizing the cytochrome c solution purified from a horse heart, showing the relative stability of cytochrome c in cases of cytochrome c alone, cytochrome c to which gelatin has been added, and cytochrome c to which gelatin and sodium sulfite have been added. 1 ml. of the aqueous solutions set forth in Table 1 was poured into ampoules. After lyophilization, the ampoules were sealed and preserved in a thermostatically controlled environment at 45° C. Thereafter the change in activity was checked. The activity was measured by the Warburg's manometer. Samples were added to a system of ascorbic acid and cytochrome oxidase to determine the oxygen consumption. The figures in the test data represent the residual activity percent as calculated from the oxygen consumption of cytochrome c.

TABLE 1

| | Period | | | | | |
|---|---|---|---|---|---|---|
| | Air not replaced by nitrogen | | | Air replaced by nitrogen | | |
| Samples | 1 week | 10 weeks | 30 weeks | 1 week | 10 weeks | 30 weeks |
| Cytochrome c 15 mg | 85 | 66 | 58 | 88 | 70 | 64 |
| Cytochrome c 15 mg., gelatin 5 mg | 81 | 67 | 56 | 88 | 72 | 65 |
| Cytochrome c 15 mg., gelatin 50 mg | 88 | 69 | 60 | 90 | 73 | 68 |
| Cytochrome c 15 mg., acid sodium sulfite 1 mg | 96 | 92 | 87 | 98 | 93 | 91 |
| Cytochrome c 15 mg., acid sodium sulfite 1 mg. plus gelatin 5 mg | 96 | 90 | 85 | 97 | 92 | 89 |

These results show that, in the lyophilized product, gelatin makes no contribution to the stabilization of cytochrome c. This non-contribution of gelatin to the stabilization of cytochrome c in lyophilization seems to be attributable to the loss of coexisting relationship between cytochrome a and gelatin in gel condition under lyophilization.

As mentioned earlier, the present invention is based on the knowledge that cytochrome c can be gradually absorbed with a longer duration of its effective concentration in the blood than in the case of injection and the efficacy is no less than when injected. As this knowledge is a vital key to an understanding of this invention, a more elaborate explanation will be made, referring to the attached diagram.

The curves in the accompanying drawing show the average of five measurements of the change in the concentration of cytochrome c in the serum when 20 mg. of a solution of horse heart cytochrome c was introduced into the vein and into the duodenum of a rat weighing about 200 g. The abscissa is the time which has elapsed after administration and the ordinate is the amount of cytochrome c ($\mu$g.) detected in 1 ml. of serum. With intravenous administration (dotted line) the value after one hour of administration is 1 μg./ml., and the cytochrome c completely vanishes in 6 hours, so that the duration of effective concentration in the blood is short. With oral administration in the duodenum (solid line) the concentration stays at over 1 μg./ml. for three hours and some cytochrome c exists in the blood flow even after 6 hours. These experimental results prove that cytochrome c can pass through the walls of intestinal canal and enter the blood flow, and also that since such passage is relatively slow, an effective concentration of the cytochrome c in the blood can be maintained for a relatively long period of time.

The quantitative analysis of the cytochrome c concentration employed in the present experiment is a new procedure worked out by the inventor for the measurement of trace amounts of cytochrome c in the serum, and is characterized by a sensitivity 100 to 1000 times as high as that of the conventional respirational activity measurement or absorption spectrum measurement so that it is able to detect a trace amount as low as 0.05 μg./ml. cytochrome c.

The new procedure is as follows: Cytochrome c is absorbed on sheep erythrocytes treated with formalin and tannic acid to produce sensitized red blood cells. These sensitized red blood cells can react with the antibody of cytochrome c and start agglutination. When, however, more than 0.05 μg. of free cytochrome c is present in this reaction system, the haemagglutination is inhibited. Thus, by producing simultaneous reactions in the diluted series of samples and in the standard diluted series of cytochrome c and comparing the degree of inhibition of the agglutination, the amount of cytochrome c in the sample can be determined.

In actual practice, chromatography of the tested serum was performed using an ammonium type Amberlite IRC-50 (trade name of a synthetic resin produced by Rohm & Haas Co.). The cytochrome c was separated from the serum and the low-molecular component was removed by dialysis. Quantitative analysis was then carried out utilizing said haemagglutination-inhibition reacton.

As is well-known, an immunological method, as illustrated by blood-type determination or virus strain identification, is characterized by an extremely high specificity. There are many variations of this method, from among which an appropriate method meeting a given purpose can be selected. The above-mentioned haemagglutination inhibition reaction method is notably sensitive among the different variations of said immunological method and is an excellent method for the quantitative analysis of traces of protein hormone in the body fluid, for instance, gonadotropin or growth hormone.

The inventor, while utilizing this sensitive and specific method, in view of the fact that cytochrome c is a strongly basic protein, adopted the process of selectively extracting and refining cytochrome c out of the tested serum by chromatography. Therefore, the results of this quantitative analysis are highly accurate and reproducible, showing exactly the change in the concentration of administered cytochrome c in the blood.

The above experimental results are an ample evidence of the fact that the efficacy of orally administered cytochrome c is as good as that of injection.

This will be more concretely demonstrated by the following test of increasing effect on leucocyte.

It has been widely known that the intravenous injection of cytochrome c is effective to restore a patient from frequent cases of leukopenia caused by administration of antitumor drugs such as Tespamin (trade name of product by Sumitomo Chemical Industries Co.) or Mitomycin C. Table 2 summarizes the results of experiments in which 35 mg. of cytochrome c per kg. of bodyweight per day was administered to leucopenic rabbits experimentally produced by administration of Tespamin. The recovery in the number of leucocytes in them was compared with the number of leucocytes in a control group of rabbits. In this experiment the cytochrome c granules produced by the method of this invention from a horse heart muscle, with an entric coating, were orally administered to the rabbits.

TABLE 2

| Number of leucocytes | Days of administration | | | | |
|---|---|---|---|---|---|
| | 0 | 5 | 8 | 12 | 15 |
| Enteric coated granules administered | 1,590 | 2,960 | 3,460 | 5,460 | 6,400 |
| Control group | 1,760 | 2,970 | 2,900 | 2,860 | 4,690 |

Figures in Table 2 are averages for 6 animals in each group

Although the animals in the control group recovered naturally with a recognized increase in the number of leucocytes, the recovery in the test group administered with enteric coated granules of cytochrome c of this invention was faster, thus evidencing the promotion of leucocyte production by cytochrome c. If the recovery process is treated as two groups of three-dimensional sample vectors in the same time series and their population mean vectors are statistically compared a significance at a level less than 5% can be recognized between the two.

On the other hand, comparison in practical clinical examples between the cytochrome c according to the present invention and the injected cytochrome c has revealed that the cytochrome c according to the present invention is no less efficaceous than the injected cytochrome c. Moreover, among numerous clinical examples, no case of anaphylaxis such as has been observed when using injections has been reported when using the cytochrome c according to the present invention. Thus, a serious drawback to cytochrome c injection can be eliminated by the present invention.

Some examples of application of the present invention are set forth below:

EXAMPLE 1

25 g. of purified cytochrome c from a horse heart muscle was dissolved in 370 ml. of distilled water and 75 g. of gelatin was added to the resulting solution, which was then heated to about 40° C., with occasional agitation, and dissolved gradually. A graduated cylinder having a capacity of 1500 ml. was filled with 1200 ml. of castor oil. The upper layer of the castor oil in the cylinder was heated to 20°-30° C., while the lower layer was held at 5° C. or thereabout by cooling externally with ice or other means. Next, the mixture of gelatin and cytochrome c was slowly added to the upper layer of castor oil in the cylinder, while stirring. The mixture of gelatin and cytochrome c in the upper part of the cylinder dispersed into globular particles, which were cooled while falling and settled to the bottom as gelated granules. The greater part of the castor oil was then eliminated by decantation, and the water was volatilized at less than 20° C. under a pressure of 1 mm. Hg while stirring gently. After removing the greater part of the water, the granules were collected, washed three times with acetone to eliminate the castor oil, and completely dried in a phosphorus pentoxide desiccator.

EXAMPLE 2

10 g. of cytochrome c purified from *Candida utilis*, a strain of yeast, was dissolved in 200 ml. of distilled water. 50 g. of gelatin was added to the resulting solution, which was then heated to 40° C., with occasional agitation to promote gradual dissolution. Immediately after completion of dissolution, the solution was poured into a 100 mm. x 300 mm. vat which was 10 mm. deep and left to cool.

Following complete gelation, the product was dried in a low-temperature dryer at about 20° C. and, when dried, crushed to the desired grain size.

The following test results show the stability of cytochrome c preparations according to this invention.

The sample in Table 3 consists of globular granules obtained by the process of Example 1 and the samples in Tables 4 and 5 are tablets of granules obtained by the processes in Examples 1 and 2 respectively, which were then formed into tablets with lactose as the excipient in a conventional manner.

The tables give the residual activity percent, measured in the same way as in Table 1.

TABLE 3

| Sample | Storage period at 45° C. | | |
|---|---|---|---|
| | 1 week | 10 weeks | 30 weeks |
| Granules of this invention | 98 | 92 | 91 |

TABLE 4

| Sample | Storage period at 45° C. | | |
|---|---|---|---|
| | 1 week | 10 weeks | 30 weeks |
| Tablets of this invention | 97 | 93 | 89 |

TABLE 5

| Sample | Storage period at 45° C. | | | | |
|---|---|---|---|---|---|
| | 4 weeks | 7 weeks | 12 weeks | 24 weeks | 41 weeks |
| Tablets of this invention | 96 | 95 | 96 | 94 | 89 |

As is obvious from Tables 3–5, the cytochrome c preparations according to the present invention, in spite of the fact that the stabilizer which is indispensable for conventional cytochrome c preparations is not used, can retain their activity over a very long period under storage at 45° C. When this stability is contrasted to that of the conventional lyophilized preparations suitable for injection as set forth in Table 1, it is seen that the preparations according to this invention are equivalent to the conventional preparations for injection to which stabilizers have been added and in the ampoules of which the air has been replaced by nitrogen. Meanwhile, as the curves in the accompanying drawing indicate, the cytochrome c preparations according to this invention can maintain their concentration in the blood for many hours at a substantial level.

What is claimed is:

1. The method of producing a stable preparation containing cytochrome c which comprises the step of gelating a mixture of gelatin and an aqueous solution of cytochrome c, and drying the resulting gel to thereby form gel-like solidified gelatinous granules maintaining the cytochrome c in a colloidal gel state.

2. The method claimed in claim 1 comprising the step of forming said mixture into globules before drying by heating said mixture to a temperature greater than the ambient temperature but insufficient to impair the activity of the cytochrome c and introducing it into a liquid which is immiscible with water.

3. The method claimed in claim 2 in which said immiscible liquid is cooler than said mixture and said mixture is introduced thereinto in the form of drops.

4. The method claimed in claim 2 in which said immiscible liquid is cooled after said mixture is introduced thereinto.

5. The method claimed in claim 2 in which said globules are removed from said immiscible liquid and then dried in a dehydrating solvent.

6. The method of introducing cytochrome c into a living body which comprises the step of orally administering gel-like solidified gelatinous granules containing said cytochrome c in a stable colloidal gel state.

7. A tablet for oral introduction into a living body which comprises gel-like solidified gelatinous granules containing cytochrome c in a stable colloidal gel state.

References Cited

UNITED STATES PATENTS 3,215,685  11/1965  Nakanishi et al. _____ 260—112

FOREIGN PATENTS 614,431  3/1962  Belgium.
13,396   7/1963  Japan.
917      1/1966  Japan.

OTHER REFERENCES

Chem. Abstracts 58: p. 420G (1963).
Chem. Abstracts 59: p. 12600a (1963).
Chem. Abstracts 64: p. C14042b (1966).

SHEP K. ROSE, Primary Examiner

U.S. Cl. X.R.

424—177, 360; 264—4; 252—316; 260—112